United States Patent [19]

Milholen

[11] 4,278,378
[45] Jul. 14, 1981

[54] BRICK STACKER HAVING AUTOMATIC VOID ROW FORMING

[75] Inventor: William F. Milholen, Siler City, N.C.

[73] Assignee: AMI Industries, Inc., Downey, Calif.

[21] Appl. No.: 65,898

[22] Filed: Aug. 13, 1979

[51] Int. Cl.³ .............................................. B65G 57/26
[52] U.S. Cl. ...................................... 414/32; 414/61; 414/786; 198/434
[58] Field of Search ........................ 414/32, 33, 34, 60, 414/61, 120, 70, 71, 786; 198/434; 294/63 R, 63 A

[56] References Cited

U.S. PATENT DOCUMENTS

| | | | |
|---|---|---|---|
| 3,731,785 | 5/1973 | Stuart | 294/63 A X |
| 3,834,298 | 9/1974 | Paschal et al. | 414/120 X |
| 3,917,081 | 11/1975 | Pearne et al. | 414/61 X |
| 4,182,442 | 1/1980 | Jones | 414/63 A X |

Primary Examiner—Leslie J. Paperner
Attorney, Agent, or Firm—Pearne, Gordon, Sessions, McCoy & Granger

[57] ABSTRACT

A method and apparatus for stacking brick in packages suitable for shipping or handling is disclosed. Such package is provided with two spaced voids adapted to receive the fork of a lift mechanism for handling the package. Arrays of rows of superposed pairs of brick are received at a setdown position and are conveyed to a transfer position where they are assembled in grids for stacking. A void row grid is formed by removing as a unit the upper layer of selected rows of brick to form a first void and such upper layer is subsequently inserted between adjacent superposed pairs of brick at another location to form a grid having a full lower layer and an upper layer having spaced voids therein. The void row grid is transferred to the stack by gripping the lower full layer thereof.

15 Claims, 14 Drawing Figures

BRICK STACKER HAVING AUTOMATIC VOID ROW FORMING

BACKGROUND OF INVENTION

This invention relates generally to brick handling equipment or the like, and more particularly to a novel and improved method and apparatus for automatically unloading fired brick from a kiln car and for arranging such brick in a stack suitable for storage or handling.

Prior Art

Brick are normally packaged for storage or handling in rectangular stacks having two spaced voids located and sized to permit the stack to be handled by inserting the fork of a lift truck or the like into the voids. Such stacks are strapped and can be handled without the use of a pallet or other base.

A number of different machines have been used or proposed for automatically unloading kiln cars and for forming such stacks. The U.S. Pat. Nos. 3,392,851; 3,487,959; 3,491,901; 3,601,266; 3,656,634; 3,893,575; 3,917,081; 4,040,532; 4,068,766 and 4,221,517 (all assigned to the assignee of the present invention) describe examples of such machines.

Such prior art machines sometimes provide means for automatically forming void rows and in other instances provide for the production of the void rows by operations which are at least partially manual.

SUMMARY OF THE INVENTION

A method and apparatus in accordance with the present invention provide for the automatic production of stacks suitable for storage and shipment in which voids are automatically produced at selected locations within the stack in a novel and improved manner. In the illustrated embodiment, rows of superposed pairs of brick are moved along a marshaling system to a pick-up position wherein grids, consisting of abutting rows of upper and lower superposed pairs of brick, are assembled and transferred to a stacking platform. Selected grids are formed which have spaced voids in the upper layer thereof. Such void row grids are produced by separating the upper and lower brick of selected rows and by positioning the upper brick of such rows at one location within the lower course or layer of the grid and positioning the lower brick of said selected rows at a second spaced location in the same lower course or layer. This produces a grid having upper and lower layers in which the lower layer is full and the upper layer has two spaced voids. Such void row grid in then positioned within a stack of full grids formed on a stacking platform.

With this invention, the two voids are formed without removing brick from the supply of brick moving along the marshaling system or by inserting brick from a separate supply. Instead, the voids are produced merely by moving selected brick from one location to another location within the supply of brick being moved along the marshaling or conveying system.

Further, in the illustrated embodiment, the void formation is accomplished without moving the selected brick from one location to another with respect to the machine. Instead, the upper brick in selected rows of superposed pairs of brick are merely gripped at one location and held while the brick move along the marshaling system and at an appropriate time are deposited in the same location with respect to the machine but at a different location with respect to the flow of brick moving along the marshaling system. The void formation in the illustrated machine is provided by a simple lifter and a simple gripper in combination with the count-off table portion of the marshaling system.

With the present invention, grids of substantially any width can be produced and it is not necessary to supply the machine with arrays of any particular width. Further, the illustrated embodiment is arranged to handle large numbers of brick during each cycle of operation so that high production is obtained without rapid machine movements.

DETAILED DESCRIPTION OF THE DRAWINGS

Figures 1, 2:
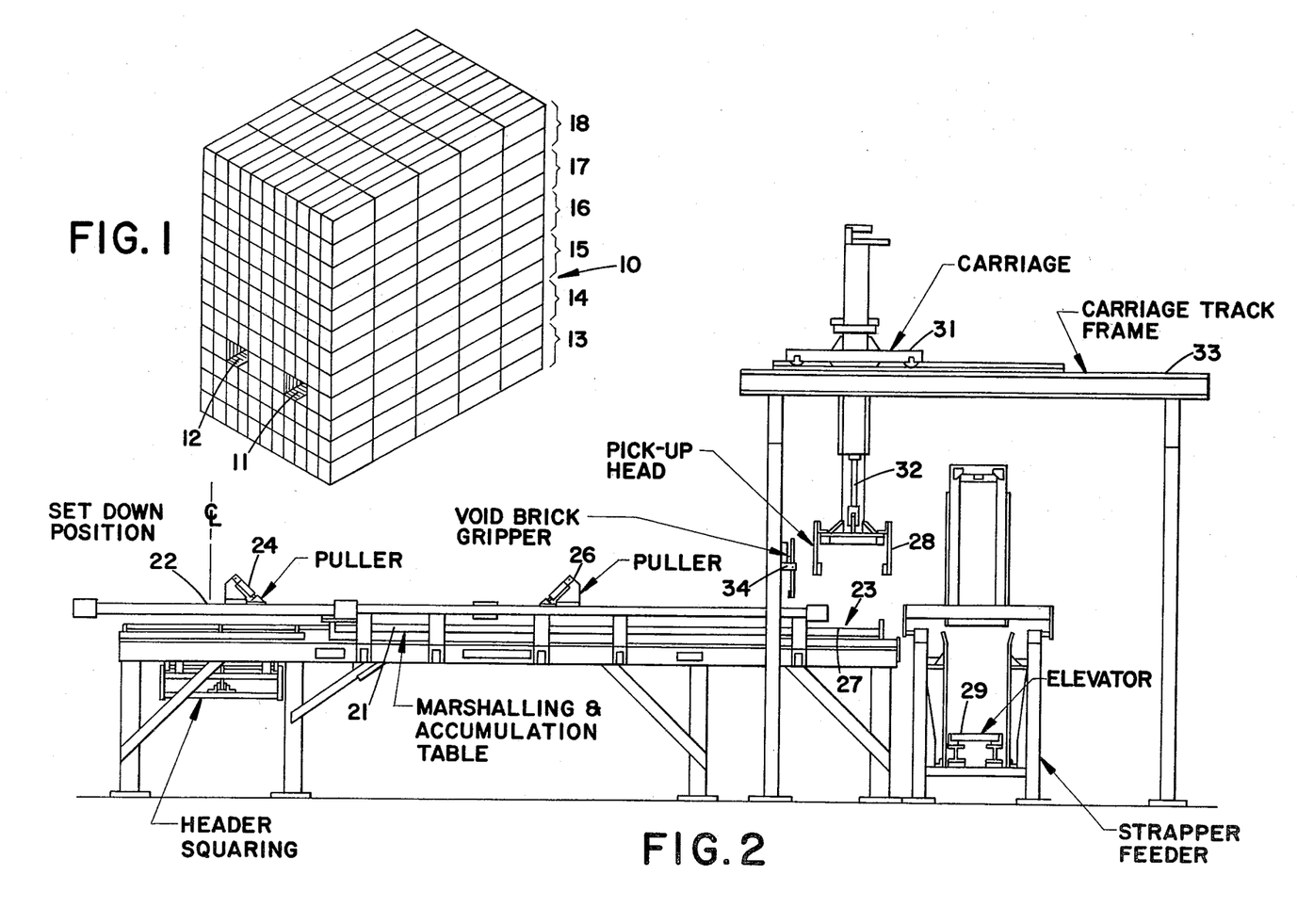
FIG. 1 is a perspective view illustrating a typical stack of brick formed by the method and apparatus of this invention.
FIG. 2 is a side elevation of the machine.

FIG. 1 illustrates a typical stack of brick formed in a rectangular package suitable for handling and storage. Such packages are conventionally strapped together by straps and corner pieces (not illustrated) so that the stack 10 can be handled with a conventional lift fork truck or other fork systems by inserting the forks into the two voids 11 and 12 provided in the illustrated package in the fourth row from the bottom.

The illustrated package includes grids 13 through 18. Each grid consists of an upper layer and a lower layer of sidewise and endwise abutting brick. In the illustrated package 10 the grids are five brick long and eleven brick wide, so each full layer or course contains fifty-five brick and each full grid contains one hundred and ten brick.

All of the grids 13 through 18, except for the grid 14, are full grids containing one hundred and ten brick, but the grid 14, which is the void row grid, contains voids 11 and 12 extending lengthwise along the upper layer of the grid. Each of the voids is two brick wide, so the upper layer contains only seven rows of five endwise abutting brick, or thirty-five brick. The lower layer of the grid 14, however, contains the full fifty-five brick. The illustrated package 10 contains six hundred and forty brick. It should be understood, however, that the present invention is not limited to the formation of the package of this particular size and can be used to form packages having greater or lesser numbers of grids and grids of different sizes, and that the package 10 illustrated in FIG. 1 is given merely as an example of one package 10 which can be produced in accordance with the present invention.

FIG. 2 is a side elevation of the machine, illustrating the general arrangements thereof. It consists of a marshaling and accumulation table system 21 extending from a setdown position at 22 to a pickup position 23 and along which the bricks are conveyed. Arrays of brick are removed from the stacks of fired brick on the kiln car and are transferred automatically to the setdown position 22, utilizing any suitable unloader system such as an unloader of the type described generally in U.S. Pat. Nos. 3,601,266 and 3,656,634. Such patents are incorporated herein by reference to the extent that they describe a transfer gripper which is operable to grip entire arrays of fired brick from a stack on a kiln car and to transfer the brick to a setdown location. However, with the present invention, it is preferable to provide a transfer gripper which is operable to simultaneously transfer two or more arrays to the setdown position 22.

Generally, the brick in the stacks on the kiln car are arranged in arrays consisting of rows of superposed pairs of brick wherein at least some of the rows are spaced from adjacent rows to facilitate the firing process. The gripper transfer operates to slide the spaced rows toward each other into abutting engagement and then grips the entire array for transfer to a setdown position.

A pair of pullers 24 and 26 are provided above the marshaling and accumulation table 21 and cooperate to move the arrays from the setdown position to a countoff table 27, which forms part of the marshaling and accumulation table system and which supports the grids at the pickup position 23. The manner in which the arrays are moved along the marshaling table will be discussed in detail below.

Located at the pickup position 23 is a pickup head 28 which is operable to grip the lower layer of brick of a grid at the pickup position and to transfer the grid to a stacking elevator 29 on which the stack is formed. The pick-up head 28 is mounted on a carriage 31 for vertical movement with respect thereto and is powered for such vertical movement by piston and cylinder actuators 32 in a manner known to those skilled in the art. The carriage 31 is movable back and forth along the carriage track frame. Here again, a suitable piston and cylinder actuator may be employed to move the carriage back and forth.

The stacking elevator 29 is provided with a stacking platform on which the stack is actually formed. Such platform is normally arranged to move up to an upper position in which the first grid 13 is positioned and is then operated to successively move down to position the top layer of the uppermost grid to a level so that the subsequent grids can be released at the same level as the first grid 13. Such stacking elevators are known to those skilled in the art, and reference may be made to U.S. Pat. No. 3,656,634 for a more detailed description thereof. After a stack is fully formed on the stacking elevator 29, it is moved to a strapper to complete the packaging operation.

A void brick gripper 34 is mounted on the machine frame and operates to grip the upper layer or course of selected rows of superposed pairs of brick to form the void row grid 14 in a manner discussed in detail below.

Figure 3:
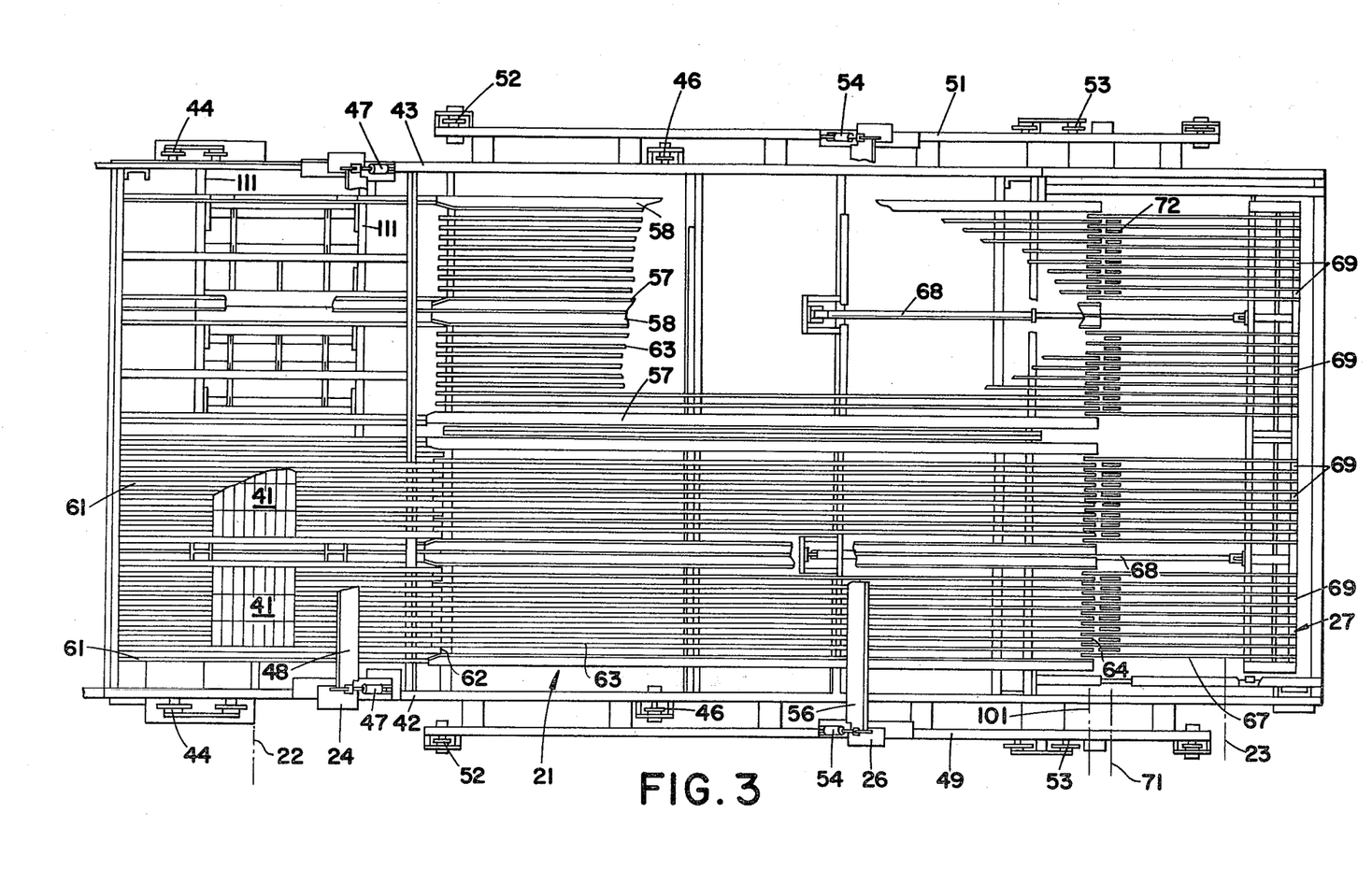
FIG. 3 is a plan view of the marshaling and accumulating system, with parts broken away for purposes of illustration.

FIG. 3 is a plan view of the marshaling and accumulation table system 21 along which the brick are conveyed during the operation of the machine. The arrays of brick removed from the kiln car are deposited on such table at the setdown position 22. In the illustrated embodiment, four spaced-apart arrays 41 are simultaneously positioned along the setdown position at spaced locations across the marshaling and accumulator table 21. In FIG. 3, the machine is cut away for purposes of illustration, so only one full array 41 and a portion of the second one is illustrated, but it should be understood that two additional arrays 41 are deposited at the setdown position in a symmetrical manner across the marshaling and accumulator table 21.

Each of the arrays contains an upper and lower layer and consists of three rows of side-abutting, superposed pairs of brick, with each row containing eight pairs of brick. Located at the setdown position is a mechanism to close against the ends of the brick in each array 41 to move the brick endwise into lateral alignment. This mechanism is discussed in detail below.

The first puller 24 is supported by side rails 42 and 43 for lengthwise movement of the table 21. A drive system including sprockets 44 and 46 is connected by drive chains to the puller 24 to move the puller back and forth along the table between a position substantially adjacent to the sprockets 44 at one extremity and substantially adjacent to the sprockets 46 at its other extremity of movement. In the drawings, the chains are not illustrated in order to simplify the drawing, but conventional sprocket and chain structure is utilized, and these are well known to those skilled in the art. The first puller 24 also includes a pair of piston cylinder actuators 47 which operate to raise and lower a puller bar 48 so that the puller bar can be dropped down behind the arrays 41 when the puller 24 is moved to the right as viewed in FIG. 3 and raised to clear the arrays 41 as it is moved to the left to be positioned for pulling additional arrays.

The second puller 26 is provided with a similar structure, but moves longitudinally of the table along tracks 49 and 51 by a chain drive (not illustrated) which extends over sprockets 52 and 53. Here again, the second puller 26 is provided with piston and cylinder actuators 54 to raise and lower the puller bar 56. The extent of movement of the two pullers is arranged so that the first puller 24 can move the arrays 41 onto the center portion of the marshaling and accumulator table system to a position in which the second puller 56 can drop down behind the arrays and continue their movement along the table to the right, as viewed in FIG. 3.

A pair of guide rails 57 and 58 is provided above the center portion of the marshaling table system 21 for each of the line of arrays 41. These rails are spaced to maintain the lateral alignment of the rows of the brick on the table system. Longitudinal alignment is maintained by the puller bars, since the drive for each of the pullers is arranged so that the puller bars move down the table while being positioned in a direction perpendicular to the length of the table.

The table at the setdown position is formed by a plurality of spaced, round rods 61 which extend from the left end of the table to a position at 62. The rods support the brick in the arrays 41, but allow any loose particles, chips, or other debris to fall through, thereby providing a cleaning function. The center portion of the table is provided by a plurality of spaced, rectangular bars 63 which extend between the ends of the bars 61 to provide an uninterrupted support structure for the brick moving along the table, and end at a location 64. Preferably, such bars are rectangular and provide a smooth upper surface to engage the brick moving along the table, since most of the debris will have fallen through between the bars 61. However, because the bars 63 are spaced apart, additional debris will also be allowed to fall down between the bars as the bricks are moved along the table.

Located at the right end of the marshaling and accumulator table 21 is the countoff table portion 27 which can move axially from an extended position to a retracted position. The countoff table 27 again consists of a plurality of spaced bars 67 which extend between the bars 63 a small distance when the countoff table is fully extended and telescope in along between the bars when the countoff table 27 is retracted. A pair of piston and cylinder actuators 68 are mounted between the countoff table 27 and the main frame of the machine to provide retraction or extension of the table, as discussed in greater detail below. Further, a plurality of upstanding stops 69 extend above the plane of the table to engage the forwardmost row of brick for positioning such brick with respect to the table and for driving the countoff table 27 by means of the brick being moved by the second puller during at least portions of the machine cycle. In FIG. 3, the countoff table 27 is shown substantially in its extended position and the center line 23 designates the center line of the pickup position.

The void row forming mechanism is located just beyond the ends 64 of the bars 63 and is located along the center line 71, illustrated in FIG. 3. At this position, a plurality of lifter plates 72 are positioned in alignment with the bars 63 and between the bars 57 of the countoff table 27. These lifter plates are operable to raise a pair of rows of brick so that the upper layer of such rows can be gripped.

Figure 4:
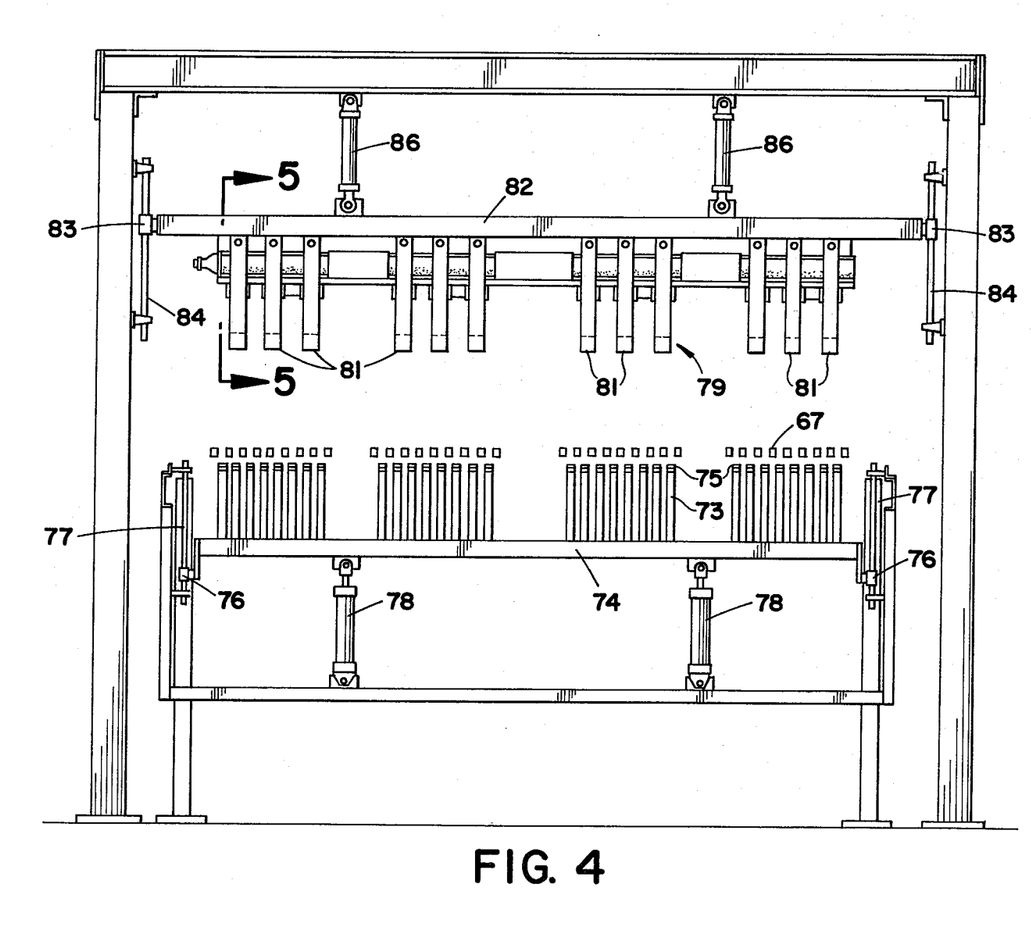
FIG. 4 is a cross section through the machine illustrating the lifter and gripping mechanisms of the void forming system.

FIG. 4 illustrates the void row forming system, which includes the lifter plates 72 positioned below the bars 67 of the pickup table and aligned with the openings therebetween. The lifter plates 72 are mounted on the upper ends of support posts 73, which are in turn mounted on a cross beam 74. The ends of the cross beam 74 are guided by bearings 76 which slide up and down along stationary rods 77. A pair of piston and cylinder actuators 78 provides the power for raising and lowering the cross beam 74, and in turn the lifter plates 72. When the cylinders 78 are in the retracted position illustrated in FIG. 4, the lifter plates 72 are below the upper level of the bars 67 so that they do not affect the movement of rows of brick onto such bars. However, extension of the two actuators 78 raises the lifter plates 72 up between the bars and operates to lift any brick immediately above the lifter plates up off the support bars 67, so that they can be gripped by a void row gripping assembly 79.

The void row gripping assembly 79 includes a plurality of individual grippers 81 arranged in four groups, each including three grippers. The grippers 81 are supported on a cross beam 82, which is guided for vertical movement by bearings 83 which slide along rods 84 mounted on the machine frame. Here again, a pair of piston and cylinder actuators 86 are connected between the machine frame and the cross beam 82 to raise and lower the grippers 81.

Figure 5:
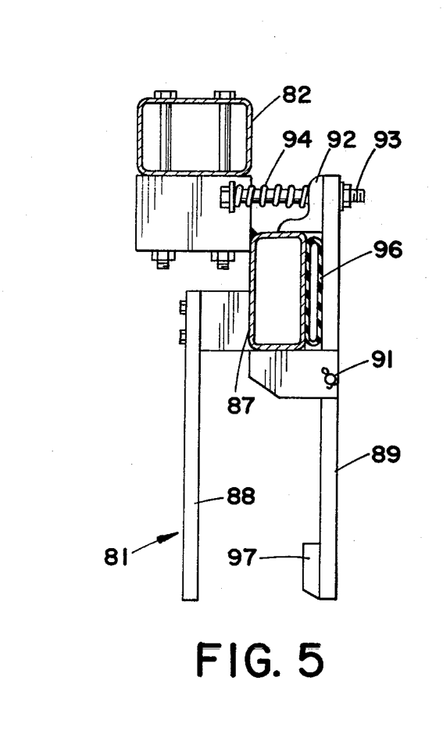
FIG. 5 is an enlarged, fragmentary section taken generally along line 5—5 of FIG. 4 illustrating the structure of the gripping mechanism.

The structure of the grippers 81 is best illustrated in FIG. 5, and includes a cross beam 87 carried by the beam 82 on which the individual grippers 81 are mounted. Each gripper includes a stationary finger 88 which is carried by the beam 87 and extends vertically downward to the free end. Also mounted on the beam 87 is a movable finger 89 pivoted on a pivot pin 91 for oscillating rotation about such pin. A spring system includes a fixed angle member 92 mounted on the beam 87 and a bolt 93 which extends through the angle member 92 and the upper end of the finger 89. A spring 94 normally maintains the upper end of the finger 89 against the angle member 92, which is the open or released position of the gripper.

Operation of the grippers is provided by a pneumatic tube 96 which extends along the face of the beam 87 and between such beam and the upper portion of the fingers 89. When such tube is pressurized, it assumes a shape more nearly circular and causes the finger 89 to pivot about its pivot pin 93 in a clockwise direction, as illustrated in FIG. 5. This causes the lower end of the finger 89 to move toward the lower end of the stationary finger 88 and grip any brick located therebetween. A resilient pad 97 is preferably mounted on the finger 89 to provide the actual brick-engaging surface.

Figure 6:
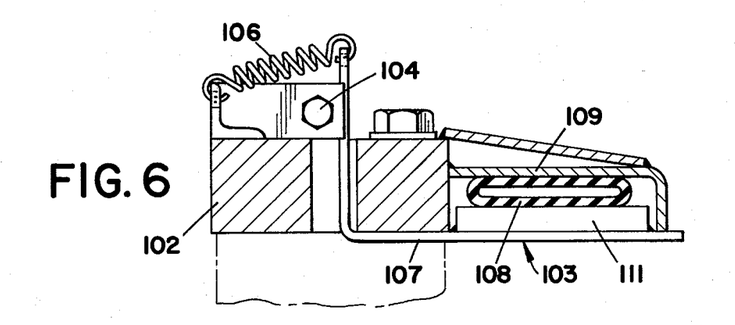
FIG. 6 is an enlarged, fragmentary section illustrating the structure of the brake used to hold the brick against movement with respect to the marshaling table.

A brake system illustrated in FIG. 6 is mounted along a center line 101, illustrated in FIG. 3, immediately over the ends of the bars 63 to prevent movement of brick resting on the bars 83 when the countoff table 27 is extended to separate brick therefrom. This brake mechanism includes a cross beam 102 having an L-shaped plate 103 mounted by a pivot 104 for oscillating movement around such pivot. The vertical leg of the plate 103 extends beyond the pivot 104 and is connected to a spring 106 which biases the lower horizontal leg 107 against the undersurface of the beam 102. Mounted above the lower leg 107 is another inflatable tube 108 which is positioned between a stationary plate 109 and a spacer 111 on the lower leg. The spring normally maintains the system in the illustrated position, but when the tube 108 is inflated, it overcomes the action of the spring and rotates the lower leg 107 down into engagement with the upper surface of any rows of brick positioned immediately below the brake. When the tube is deflated, the spring again returns the system to the illustrated position and the brake is released.

Figure 7:
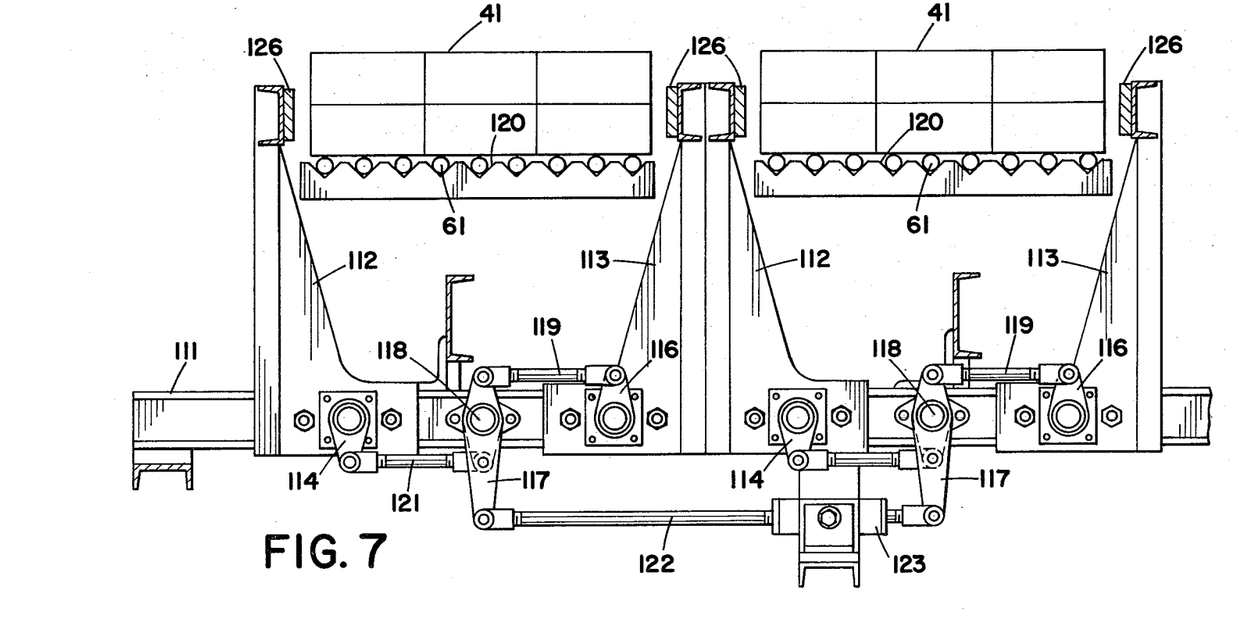
FIG. 7 is an enlarged, fragmentary cross section of the mechanism used to ensure endwise alignment of the brick at the setdown position.

The mechanism for ensuring lateral alignment between the brick in the arrays 41 at the setdown position is best illustrated in FIG. 7. In such figure, only one-half the aligning mechanism is illustrated. It should be understood, however, that additional, similar aligning mechanism is provided for the other two arrays 41.

The mechanism includes a pair of cross beams 111 mounted beneath the table between which four pairs of sliding jaws 112 and 113 are supported for horizontal sliding movement. In FIG. 7, only two pairs of such jaws are illustrated, with the understanding that in the complete machine there are a total of four pairs. Each of the jaws 112 is provided with a downwardly extending, fixed projection 114 and each of the jaws 113 is provided with an upwardly extending, fixed projection 116. Mounted between each pair of jaws for pivotal movement is a rocker arm 117 pivoted for movement about an axis 118. The upward projection 116 is connected through a pivoted bar 119 to the upper extension of the rocker arm 117, and the downwardly extending projection 114 is connected through a pivoted bar 121 to the rocker arm 117 below the pivot axis 118. With this structure, when the rocker arms 117 pivot in an anticlockwise direction as illustrated in FIG. 7, the two jaws slide toward each other and when the rocker arms 117 rotate in a clockwise direction, the sliding jaws move apart. The geometry is arranged so that the movement of the two sliding jaws 112 and 113 is equal and opposite so as to ensure that the brick are properly centered at the completion of the aligning operation.

The two rocker arms are connected to a double-ended piston 122 of a single cylinder 123 so that a single cylinder operates the two pair of sliding jaws illustrated. The upper ends of the jaws 112 and 113 extend to a position at about the midheight of an array 41, resting on the bars 61 at the setdown position. The pairs of bars are respectively moved inward by the mechanism just described to move the various brick in the arrays 41 to a laterally aligned position by engaging the opposite ends of the endwise aligned brick. After the operation, the various arrays 41 are properly aligned and centered at the setdown position, and the jaws retract back to the illustrated retracted position. In order to ensure full contact, each of the jaws is provided with a resilient pad 126 to compensate for variations in lengths of brick and ensure that proper alignment is obtained.

In operation in the forming of full grids, the first puller 24 moves in behind the array 41 at the setdown position and after the operation of the aligning mechanism of FIG. 7, pulls the four arrays 41 to the right, as viewed in FIG. 3, onto the center portion of the marshaling and accumulator table 21. After such arrays are delivered to such positions, the first puller returns to bring along additional arrays which have been transferred to the setdown position. While this is occurring, the second puller 26 drops down behind the brick on the central portion of the marshaling table and progressively moves such brick down between the guide rails 57 and 58 toward the countoff table 27.

After the preceding grids have been removed from the countoff table 27 by the pickup head 28, the countoff table moves to its retracted position so that the upstanding stops 69 are substantially adjacent to the ends of the rods 63 at 64. This movement of the countoff table is controlled by the actuators 68. The second puller 56 then operates to slide the accumulated rows of brick down the rods 63 until the forward rows engage the stop 69. The puller 56 then continues to move the brick and causes them to drive the countoff table 27 through the action of the stops 69 until the proper number of brick to form the grids for the stack are resting on the bars 67 of the countoff table 27. In the illustrated package, wherein the grids are required to have eleven laterally abutting rows of endwise aligned brick, the puller operates until there are eleven rows of superposed pair of brick resting on the bars 67 of the countoff table 27. During this movement, countoff table is moved by the puller 26 through the action of the bricks themselves and the valves of the actuators 68 are set to allow free movement of the pistons thereof.

At this point in the cycle, the brake 103, illustrated in FIG. 6, is operated to clamp the twelfth row and the actuator 68 extends to move the countoff table out to its extended position to properly position the grids thereon at the pickup position. It should be noted that during each cycle, there are four separate grids arranged for pickup. Each grid contains three pairs of superposed brick in endwise alignment and eleven pair of laterally abutting brick, for a total of 66 brick in each grid. Since there are four grids, each cycle of the machine presents 244 brick for transfer to the stacking elevator 29.

Figure 8A:
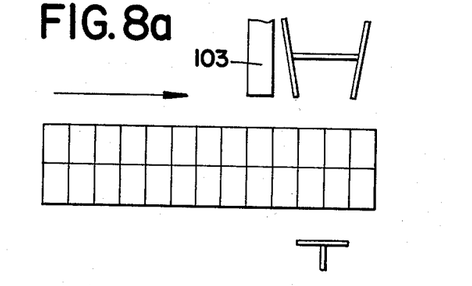
FIGS. 8a through 8g are schematic views progressively illustrating the formation of a void row grid.
Figure 8B:
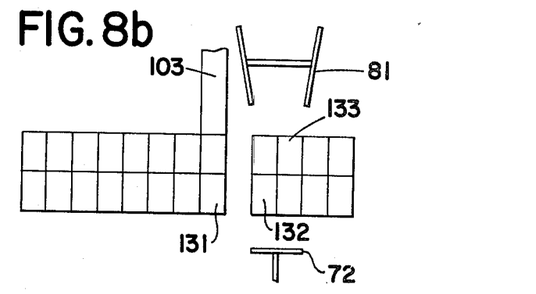

When void row grids are required, the operation of the machine is automatically modified to produce such grids. The forming of the void row grids is best illustrated by the sequence of operations illustrated in FIGS. 8a through 8g. FIG. 8a illustrates the movement of the superposed pairs of brick along the marshaling table past the brake 103 in its released position until there are four pairs of brick located beyond the brake and resting on the countoff table 27. The brake is then operated to grip the row beneath the brake 103, as illustrated in FIG. 8b, and the countoff table 27 is extended by the actuator 18 to provide a spacing between the row 131 gripped by the brake 103 and the adjacent row 132, which is then located below the void row grippers 81 and above the lifter plates 72. In the illustrated embodiment, the lifter plates 72 have a length lengthwise of the table almost equal to the width of two pairs of superposed brick.

Figure 8C:
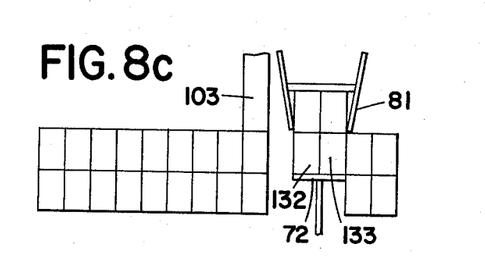
Figure 8D:
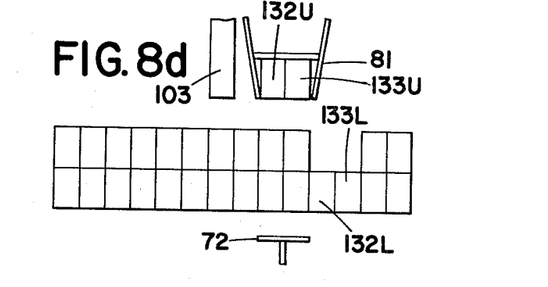
Figure 8E:
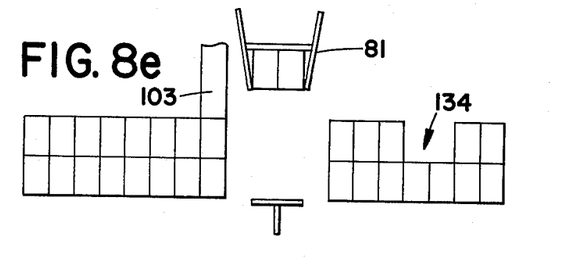
Figure 8F:
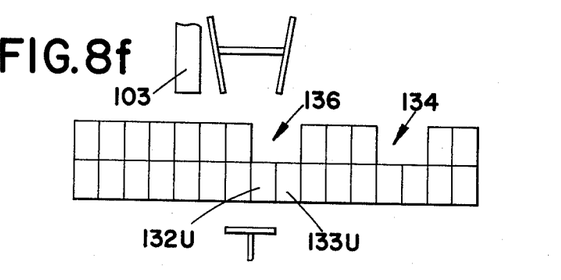
Figure 8Q:
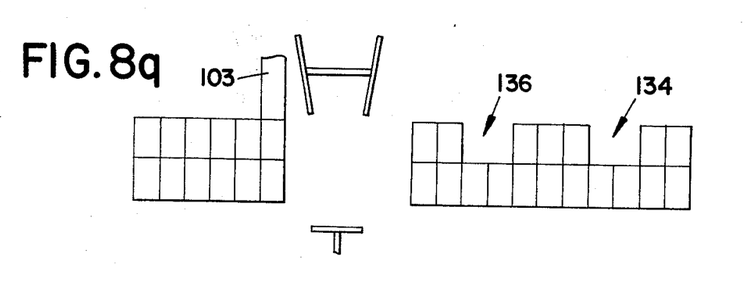

After the rows 132 and 133 are spaced from the row 131, the lifter plates 72 are raised up between the bars of the countoff table, as illustrated in FIG. 8c. This lifts the upper layer of brick in the two rows 132 and 133 up between the fingers of the void row gripper 81, which has been lowered into position by the actuators 86. The void row grippers 81 grip the projecting upper layer of brick 132U and 133U from the two rows 132 and 133 and are raised to raise such brick clear of the line of brick moving along the table. As soon as the gripping is completed, the lifting element 72 drops down to return the lower brick 132L and 133L of the rows 132 and 133 back to their initial position in the lower layer of the grid being formed. The brake 103 is then released, and the puller operates to move three additional rows onto the countoff table, as illustrated in FIG. 8b, while the void row grippers 81 hold the upper layer of brick above the moving line. The countoff table 27 is then extended to create a space between the brick gripped by the brake 103 and to move the three rows of brick adjacent to the first void at 134 past the lifter elements 72. The countoff table is extended to provide clearance so that the fingers of the void row gripper 81 can be lowered down to position the gripped brick on the countoff table where they are released. As soon as the void row gripper is released, the gripper 34 is raised clear of the brick and the countoff table 27 is retracted to close up the spaces between the rows and the void 136 is formed. As illustrated in FIG. 8f, the second puller 26 is then operated while the brake 103 is released to move two more rows of brick onto the countoff table, as illustrated in FIG. 8f. The brake 103 is then operated to clamp the brick remaining on the bars 63 while the countoff table 27 is extended to move the void row grid out to the pickup positions. In such position, the grid is formed with a full lower layer of eleven rows and an upper layer providing two spaced voids 134 and 136. This grid is gripped by the pickoff head 28 by gripping the lower layer and is transferred to the stacking elevator 29.

Subsequently full grids are formed in the manner first described, and are positioned on the void row grid to complete the stack. Normally, a separator board (not illustrated) is positioned over the void rows to prevent the bricks in the next adjacent grid above from falling into the voids. When the complete stack is formed which, in the illustrated embodiment, is six grids high, a pusher pushes the stacks off the stacking elevator into the strapper. It should be noted that the illustrated package has endwise abutting bricks in rows of five bricks, whereas, in the forming of the grids on the stacking elevators, grids three brick long are produced, with four grids simultaneously produced and handled during each forming operation. The strapping machine, however, is fed with a continuous supply of brick and straps packages five brick long. Therefore, the number of rows of lengthwise aligned brick in the final package does not have to have any particular relationship to such rows in the grids produced on the pickup position. Further, the size of the arrays 41 does not have to correspond to the lateral rows in the grids.

An alternate mechanism (not illustrated) for forming the void rows utilizes end grippers which are lowered to grip the ends of the upper layer of bricks in the two rows 132 and 133 and to then raise the gripped upper layer clear of the line of brick. In such system, the lower layer of brick in such rows remains in the lower layer of the grid being formed and is not raised and lowered as in the illustrated embodiment. The upper layer is then supported while additional rows are pulled onto the countoff table and until a space has been provided as illustrated in FIG. 8e. The end gripper is then lowered to release such gripped rows in the lower layer in the same manner as illustrated and the void row grid is completed in the manner described above. Since end grippers are known to persons skilled in the art, they have not been specifically illustrated.

Because the unloader in accordance with the present invention handles a large number of brick in each cycle of operation, very high capacity can be achieved without excessively rapid movement of the various parts of the mechanism. In fact, the preferred embodiment is arranged to supply stacks of two strappers with the two grids on one side of the machine being fed in one direction to one strapper and the two grids on the other side of the machine being fed in the opposite direction to another strapper. The machine illustrated is capable of simultaneously receiving one hundred and ninety-two brick at the setdown position. However, the full grids formed at the pickup position each include sixty-six brick, and since there are four grids formed, a total of two hundred sixty-four brick are formed in grids for simultaneous transfer to the stacking elevator during each transfer of full grids. Of course, in the void row grids there are less brick because of the voids and each transfer of the four void row grids accomplishes the transfer of two hundred sixteen brick.

The forming of the voids is accomplished in a steady flow condition because the two voids are formed from a single pair of superposed brick without removing or storing brick for later insertion, either manually or automatically. In fact, the upper brick of the pairs removed to form the first void 134 are not moved in any direction along the machine and are merely redeposited in the stream of the brick at an appropriate location to form the second void 136. Further, it should be recognized that although there are eleven brick across the grids being formed with the present invention, other grid widths could be easily accomplished. For example, a package having only two brick between the voids could be manufactured or a package having four brick between the voids could be manufactured with equal facility.

Preferably, the rods 61 located at the setdown position are mounted at one end and are supported near their other end in open channels 120 as illustrated in FIG. 7. With such structure, when the rods 61 wear, they can be loosened somewhat and then rotated to again provide a smooth curved surface supporting the brick for movement onto the main portion of the marshaling and accumulation table.

Although the preferred embodiment of the invention has been shown and described, it should be understood that various modifications and rearrangements of parts may be resorted to without departing from the scope of the invention as disclosed and claimed herein.

What is claimed is:

1. A brick stacker comprising a stacking platform on which grids of brick are sequentially stacked, conveyor means operable to receive arrays of rows of superposed pairs of brick at a receiving position and to move said arrays to a transfer position to produce groups of rows of grids having a predetermined number of abutting rows of superposed pairs of brick having upper and lower layers, and void forming means associated with said conveyor means cooperating therewith to remove as a unit the upper layer portion of selected rows leaving the lower layer thereof to produce a first void in said upper layer at a first location and to insert as a unit said upper layer portion into said lower layer at a second location spaced from said first void to produce a second void in said upper layer spaced from said first void, and transfer means to sequentially transfer grids from said transfer position to said stacking platform.

2. A brick stacker as set forth in claim 1, wherein said void forming means includes a gripper to grip said upper layer portion as a unit and to release said upper layer portion at said second location.

3. A brick stacker as set forth in claim 2, wherein said conveyor means cooperates with said gripper to move said rows beneath said gripper and to move said first void away from said gripper and to position said second location at said gripper.

4. A brick stacker as set forth in claim 2, wherein said void forming means includes a lifter to raise said upper layer portion above the adjacent brick, and said gripper operates to laterally grip each of the brick in said upper layer portion.

5. A brick stacker as set forth in claim 4, wherein said lifter raises both said upper and lower brick in said selected rows and subsequently returns said lower brick to said lower layer after said gripper grips said upper layer portion.

6. A brick stacker as set forth in claim 2, wherein said conveyor means includes means to separate adjacent rows of brick to allow said upper layer portion to be positioned therebetween.

7. A brick stacker as set forth in claim 6, wherein said conveyor means includes alignment means operable to press against opposite ends of said arrays to ensure that the brick therein are aligned in at least one direction.

8. A brick stacker as set forth in claim 7, wherein said conveyor means includes a substantially horizontal surface along which said brick moves, and a puller to move rows of brick along said surface, said puller operating to establish and maintain alignment of said brick in a direction perpendicular to said one direction.

9. A brick stacker as set forth in claim 8, wherein said surface is provided by a plurality of spaced and parallel bars between which debris can pass.

10. A brick stacker as set forth in claim 1, wherein said conveyor means includes means to separate adjacent rows of brick to allow said upper layer portion to be positioned therebetween.

11. A brick stacker comprising a stacking elevator on which stacks of grids are positioned, a marshaling system providing a substantially horizontal surface along which rows of superposed pairs of brick are moved from a receiving position to a transfer position, puller means operable to move said rows of brick between said positions, said marshaling system including countoff means onto which grids of brick move and which is operable to separate rows resting thereon from following rows and to position said grids at said transfer position, transfer means operable to sequentially transfer grids from said transfer position to said stacking elevator, and void grid forming means operable to separate the upper and lower layer portions of selected rows of brick on said countoff table and to position said upper and lower layer portions in the lower layer of a grid at spaced locations to provide a grid with two spaced voids in its upper layer.

12. A method of forming stacks of brick having a layer with spaced voids therein comprising forming grids having upper and lower courses of abutting pairs of superposed brick and sequentially transferring said grids to a stack with one grid resting on another grid, forming void row grids by removing selected upper brick from predetermined rows leaving only the lower brick of such predetermined rows at one location and positioning said upper brick of said predetermined rows in the lower layer between superposed rows of pairs of brick at another location to form a void grid having a full lower course and two spaced voids in its upper course, and positioning said void row grid in a stack of grids without voids.

13. A method of forming stacks of bricks as set forth in claim 12, wherein adjacent rows of superposed pairs of brick are separated at said other location to allow said upper brick to be positioned therebetween.

14. A method of forming stacks of brick as set forth in claim 12, wherein said selected upper brick of said predetermined rows are raised above the adjacent brick, said upper brick of said predetermined rows are moved relative to the superposed rows of brick to said other location, and are positioned between adjacent rows of superposed brick at said other location.

15. A method of forming stacks of brick having a layer with spaced voids therein, coomprising forming grids having upper and lower courses of abutting pairs of superposed brick, sequentially transferring said grids to a stack with one grid resting on another grid, forming a void row grid by separating the upper and lower brick in predetermined rows and positioning said separated brick as a unit in the lower layer of said void row grid at spaced locations to produce a void row grid having a full lower layer and an upper layer with spaced voids therein, and transferring said void row grid to said stack.

* * * * *